United States Patent [19]
Sato et al.

[11] Patent Number: 4,869,439
[45] Date of Patent: Sep. 26, 1989

[54] SEAT BELT SYSTEM

[75] Inventors: Koki Sato; Shinji Mori, both of Aichi, Japan

[73] Assignee: Kabushiki Kaisha Tokai-Rika Denki-Seisakusho, Aichi, Japan

[21] Appl. No.: 212,314

[22] Filed: Jun. 27, 1988

[30] Foreign Application Priority Data

Jul. 3, 1987 [JP] Japan .................. 62-103214[U]

[51] Int. Cl.$^4$ ........................................ B65H 75/48
[52] U.S. Cl. .................................... 242/107.4 R
[58] Field of Search ............ 242/107, 107.1, 107.4 A, 242/107.4 B; 280/805, 806; 297/470, 478

[56] References Cited

U.S. PATENT DOCUMENTS

| | | | |
|---|---|---|---|
| 3,942,820 | 3/1976 | Lindblad | 280/805 X |
| 3,957,222 | 5/1976 | Bladh | 242/107 |
| 4,084,764 | 4/1978 | Mögerlein et al. | 242/107 |
| 4,099,684 | 7/1978 | Mori et al. | 242/107 |
| 4,130,252 | 12/1978 | Mori et al. | 242/107.1 |

FOREIGN PATENT DOCUMENTS

| | | | |
|---|---|---|---|
| 3430048 | 5/1986 | Fed. Rep. of Germany | 280/806 |
| 53-20733 | 2/1978 | Japan . | |
| 53-20734 | 2/1978 | Japan . | |
| 56-9480 | 3/1981 | Japan . | |
| 2167647 | 6/1986 | United Kingdom | 280/805 |

Primary Examiner—Joseph J. Hail, III
Attorney, Agent, or Firm—Sixeby, Friedman, Leedom & Ferguson

[57] ABSTRACT

A seat belt system provided with a take-up apparatus for taking up a webbing to be placed around an occupant in layers around a take-up shaft comprises high-friction portions which are provided in a portion remaining wound around the take-up shaft when the webbing is placed around the occupant and which each have a larger coefficient of friction than that of the webbing. It is therefore possible to reduce tightening of the portion remaining wound around the take-up shaft when the webbing is placed around the occupant.

24 Claims, 10 Drawing Sheets

SEAT BELT SYSTEM

BACKGROUND OF THE INVENTION

1. Field of the Invention

The present invention relates to a seat belt system which is provided with a take-up apparatus for taking up a webbing to be placed around an occupant of an automobile in the form of layers around a take-up shaft.

2. Description of Prior Art

A seat belt system mounted in an automobile is provided with a take-up apparatus which takes up one end of the webbing that is used to secure an occupant and stores the webbing in the form of layers around a take-up shaft so that the occupant can pull the webbing out of the take-up apparatus and place the webbing.

Such a take-up apparatus is provided with an inertia lock mechanism which stops the webbing from being pulled out during emergency by inhibiting the rotation of the take-up shaft in the direction of pulling out of the webbing. Thus, the occupant is secured by the webbing at the time of a vehicle emergency.

However, when the rotation of the take-up shaft in the direction of pulling out of the webbing is inhibited during an emergency in this way, a high degree of tension is then applied to the webbing due to the inertia force of the occupant, and thus tightening occurs in the roll of webbing wound around the take-up shaft in layers. This causes the webbing to be pulled out from the take-up shaft even after the rotation of the take-up shaft in the direction of pulling out of the webbing has been inhibited.

SUMMARY OF THE INVENTION

Accordingly, in consideration of the above-mentioned phenomenon, it is an object of the present invention to provide a seat belt system which is capable of reducing the degree to which a webbing remaining wound around a take-up shaft is tightened during the time it is placed around an occupant of a vehicle.

A seat belt system of the present invention which is provided with a take-up apparatus for taking up a long webbing that is placed around an occupant in layers around a take-up shaft comprises the webbing which has such a length that a portion of it remains wound around the take-up shaft even when the webbing is placed around an occupant, and high-friction members or pieces which are provided at least in the portion of webbing that remains wound around the take-up shaft such as to be interposed between the layers of the webbing in the portion which remains wound and which has a larger coefficient of friction than that of the webbing.

In the seat belt system configured as described above, the high-friction member brings about an increase in the frictional resistance between the respective layers of webbing at the portion that remains wound around the take-up shaft in the state in which the webbing is placed around the occupant.

It is thus possible to reduce the extent to which the webbing is tightened in the portion remaining wound around the take-up shaft while the webbing is placed around the occupant.

BRIEF DESCRIPTION OF DRAWINGS

The accompanying drawings illustrate the preferred embodiments of the present invention.

FIG. 1 is an illustration of a state that a webbing is taken up by a take-up apparatus;

FIG. 2 is a prespective view showing a state that a rubber sheet is provided on the webbing;

FIG. 3 is a schematic elevational view showing the whole seat belt system as viewed from a front direction of a vehicle;

DESCRIPTION OF PREFERRED EMBODIMENTS

Figure 1:
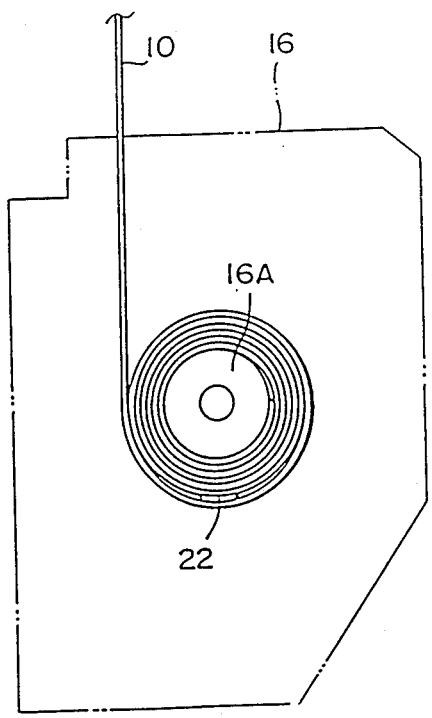
FIGS. 1 to 3 show a first embodiment of a seat belt system of the present invention.
Figure 2:
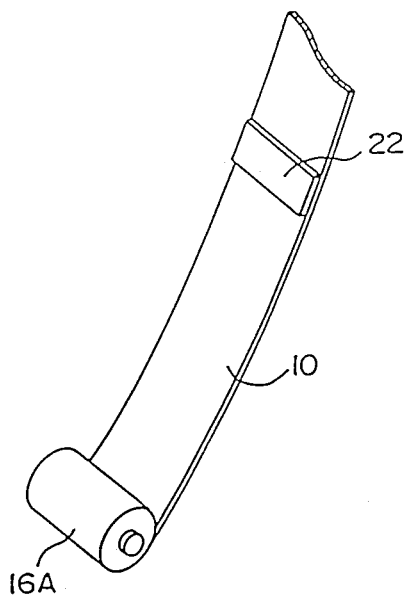
Figure 3:
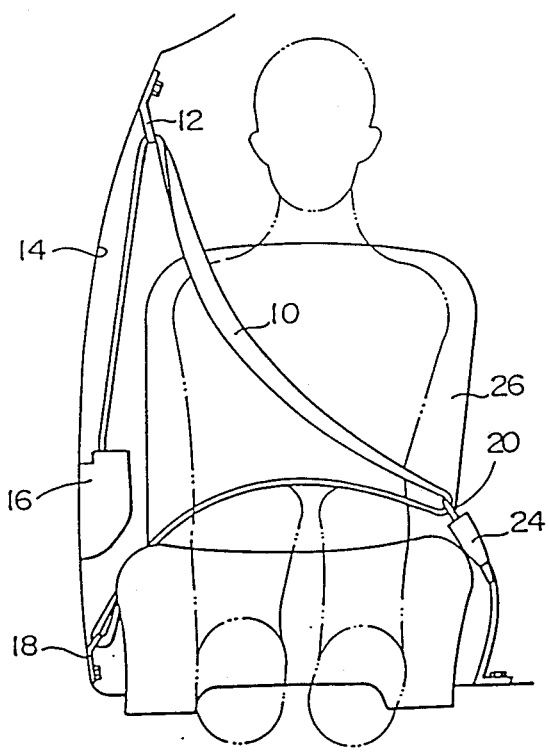

FIGS. 1 to 3 show a seat belt system of a first embodiment of the present invention.

In this seat belt system, as shown in FIG. 3, a webbing 10 is bent at an intermediate position in the lengthwise direction thereof by a slip joint 12 which is attached to an upper portion of a side wall 14 of a vehicle and supports the webbing 10 at the intermediate portion in the lengthwise direction thereof in such a manner that the webbing 10 can move through it. One end of the webbing 10 is taken up by a take-up apparatus 16 which is disposed below the slip joint 12 and the other end is engaged with an anchor plate 18 provided below the take-up apparatus 16. The take-up apparatus 16 and the anchor plate 18 are mounted on the side wall 14 of the vehicle so as to support the respective ends of the webbing 10. As shown in FIG. 1, the take-up apparatus 16 is provided with a take-up shaft 16A around which the webbing 10 is wound in layers utilizing the urging force of a spiral spring (not shown). The webbing can be pulled out against the takeup force, but, during an emergency of the vehicle, the rotation of the take-up shaft 16A in the direction of pulling out of the webbing 10 is stopped for a moment by an inertia lock mechanism (not shown) so that the pulling out of the webbing 10 is inhibited.

The webbing 10 is provided with a tongue plate 20 which is disposed between the anchor plate 18 and the slip joint 12 and through which the webbing 10 can moves in the lengthwise direction thereof, as shown in FIG. 3. The webbing 10 is also provided with a rubber sheet 22 which has a larger coefficient of friction than that of the webbing 10 and which is located in a portion remaining wound in the layers around the take-up shaft 16A of the take-up apparatus 16, as shown in FIG. 1.

The tongue plate 20 is adapted to be engaged with a buckle apparatus 24 which stands erect substantially in the center of the floor of the vehicle. When the webbing 10 is pulled out from the take-up apparatus 16 by the occupant as he sits on a seat 26 and the tongue plate 20 is engaged with the buckle apparatus 24, the webbing 10 secures the occupant in his seated position on the seat 26, as shown in FIG. 3. When the webbing 10 is placed around the occupant, the intermediate portion of the webbing 10 between the slip joint 12 and the anchor plate 12 is placed over the breast of the occupant to serve as a shoulder webbing, the intermediate portion of the webbing 10 between the tongue plate 20 and the anchor plate 18 is placed over the waist of the occupant to serve as a lap webbing. When the tongue plate 20 is removed from the buckle apparatus 24 by the occupant secured by the webbing, the webbing 10 is removed from the occupant seated on the seat 26. When the webbing 10 is removed from the occupant, the webbing 10 which was pulled out from the take-up apparatus 16 when placed around the occupant is taken up by the take-up apparatus 16 and stored by the side wall 14 of the vehicle.

Regardless of the position of the seat 26 and the stature of the occupant, the rubber sheet 22 which is bonded by means of an adhesive to a portion of the webbing 10 that remains wound around the take-up shaft 16A of the take-up apparatus 16 is always interposed between the layers of webbing on the take-up shaft when the webbing 10 is placed around the occupant, as shown in FIG. 2. The rubber sheet 22 is made of each of rubber materials such as butyl rubber, styrene-butadiene rubber, butadiene-acrylonitrile rubber, chloroprene rubber or urethane rubber.

A description will now be made of the function of this embodiment.

When the webbing 10 is pulled out from the take-up apparatus 16 by the occupant seated on the seat 26 and the tongue plate 20 is engaged with the buckle apparatus 24, the webbing 10 is placed around the occupant, as shown in FIG. 3.

In this state, part of the webbing 10 remains wound around the take-up shaft 16A of the take-up apparatus 16, as shown in FIG. 1, and the rubber sheet 22 is interposed between the layers of the webbing 10 in the portion wound around the shaft 16A.

During an emergency, the rotation of the take-up shaft 16A in the direction in which the webbing 10 is pulled out is stopped by the inertia lock mechanism (not shown), and a large degree of tension is then applied to the webbing 10 due to the inertia force of the occupant. This tension allows a tightening force to be applied to the portion of the webbing 10 wound in layers around the take-up shaft 16A. However, since the rubber sheet 22 is interposed between the layers of the webbing 10 in this portion, the frictional resistance between the layers of webbing is large, and thus the tightening of the layers of webbing 10 is inhibited.

In this way, even after the rotation of the take-up shaft 16A in the direction of pulling out of the webbing 10 has been stopped, further tightening of the layers of webbing 10 is inhibited by the rubber sheet 22 so that further pulling out of the webbing due to tightening of the portion wound around the shaft is inhibited. Thus, the extent to which the webbing is pulled out can be significantly reduced as compared with a conventional seat belt system.

Figure 4:
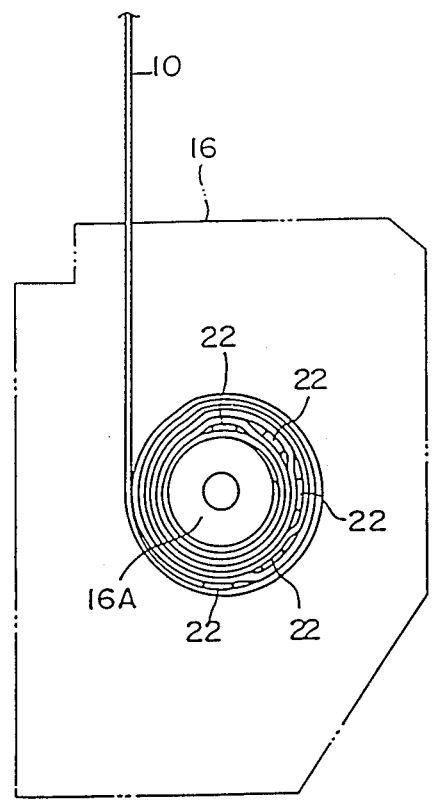
FIG. 4 is an illustration of a second embodiment showing a state that a webbing is taken up by the take-up apparatus in which a plurality of rubber sheets are disposed on one side of the webbing.

As shown in FIG. 4, when a plurality of rubber sheets 22 are provided in different positions along the length of the webbing in such a manner that they are always positioned in the portion of the webbing 10 wound in layers around the take-up shaft regardless of the stature of the occupant and the position of the seat 26, tightening of the webbing 10 wound can be even more effectively inhibited regardless of the stature of the occupant and the position of the seat 26.

Figure 5:
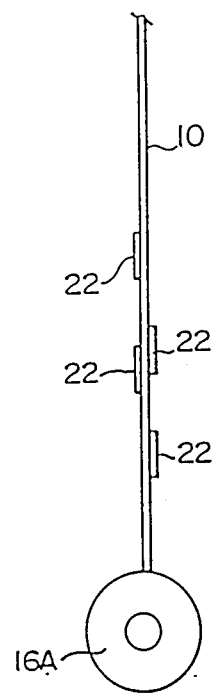
FIG. 5 is a schematic side view of a third embodiment showing a state that a plurality of rubber sheets are disposed on both sides of a webbing.
Figure 6:
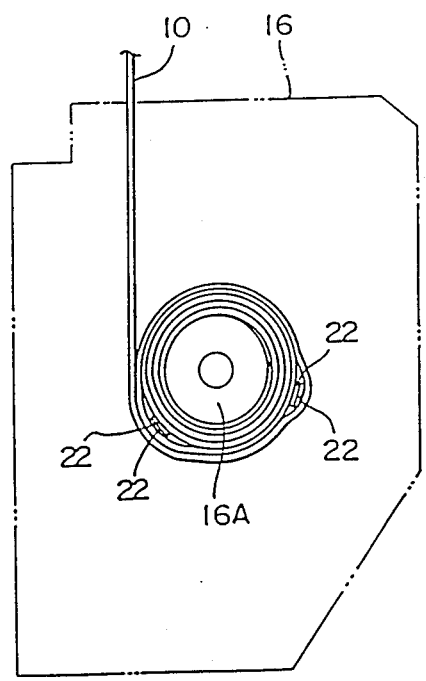
FIG. 6 is an illustration of a state that a webbing of the third embodiment shown in FIG. 5 is taken up by the take-up apparatus.

In addition, as shown in FIG. 5, when a plurality of rubber sheets 22 are provided on both surfaces of the webbing 10 in such a manner that, as shown in FIG. 6, the sheets 22 lie one upon another in the portion of the webbing taken up, the frictional resistance between the layers of webbing 10 is increased, whereby tightening of the webbing 10 in the wound portion can be inhibited even more strongly.

Furthermore, although the aforementioned embodiments use rubber sheets 22, a soft resin sheet can be used instead. The rubber sheet 22 is bonded to the webbing 10 by means of an adhesive, but rubber or a soft resin may alternatively be coated on the webbing 10. Examples of suitable soft resins include vinyl chloride resins and vinyl chloride acetate resins which are softened by adding plasticizers.

Figure 7:
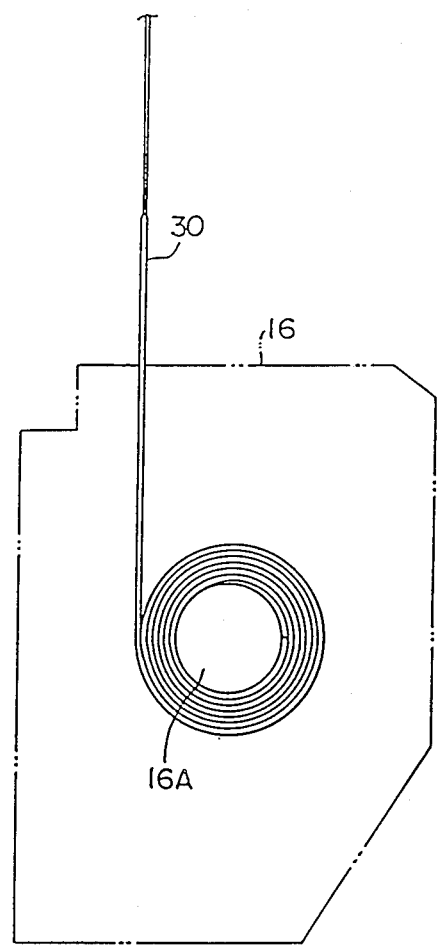
FIG. 7 is an illustration of a fourth embodiment showing a state that a taken up portion of a webbing on the take-up apparatus is wholly coated.
Figure 8:
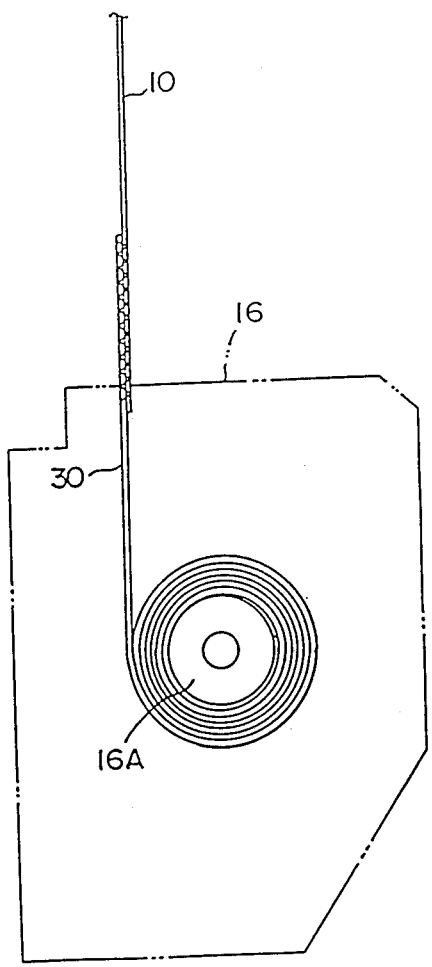
FIG. 8 is an illustration of a fifth embodiment showing a state that an end of a wholly coated webbing is seamed to an end of a uncoated webbing.
Figure 9:
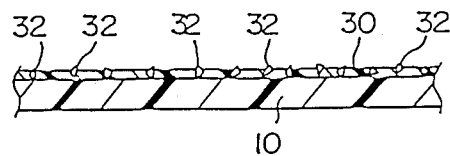
FIG. 9 is a sectional view of sixth embodiment showing a state that glass powder is buried in a webbing.

When the rubber sheet 22 is bonded to the webbing, or when rubber or a soft resin is coated thereon, it is preferable to so position the rubber sheet 22 or coated portion that it does not come into frictional contact with the slip joint 12. For example, as shown in FIG. 7, a coated portion 30 may be provided over the entire portion of the webbing taken up in layers, or, as shown in FIG. 8, a portion of webbing to be coated may be separately provided and then after being coated is connected to the main part of the webbing by sewing or welding to form a coated portion 30. When a coating of rubber or a soft resin is provided, glass powder 32 may be buried in the coated portion 30 as shown in FIG. 9, and the glass powder 32 increases the frictional resistance so that tightening of the webbing 10 wound in layers can be inhibited very strongly. In this way, frictional resistance may be increased by forming irregularities on the surface of the coating, using powder or grains such as glass powder or metal powder.

Figure 10:
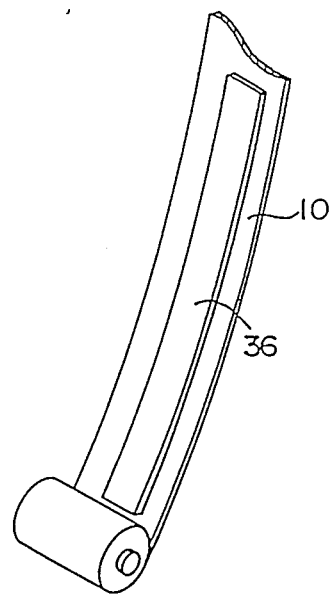
FIG. 10 is a perspective view of seventh embodiment showing a state that a tape is longitudinally connected to a webbing.
Figure 11:
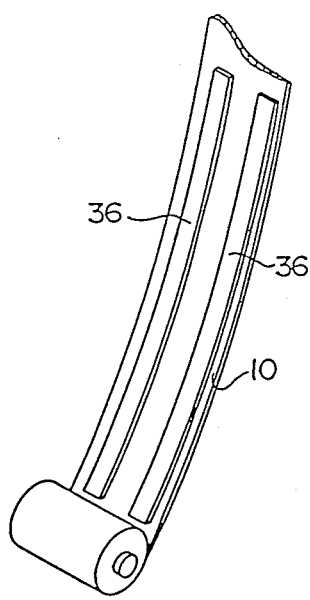
FIG. 11 is a perspective view of eighth embodiment showing a state that tapes are parallel connected to a webbing.
Figure 12:
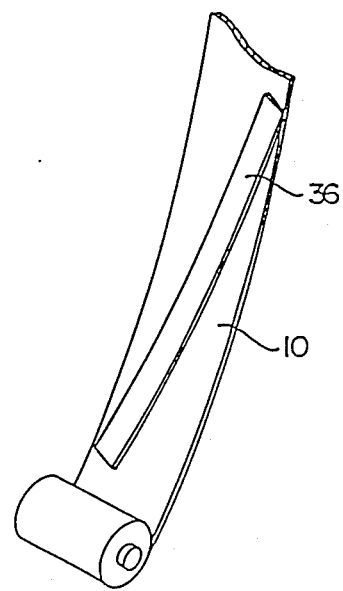
FIG. 12 is a perspective view of nineth embodiment showing a state that a tape is obliquely connected to a webbing.

A tape 36 may also be bonded to the webbing 10 in place of the rubber sheet 22 as shown in FIG. 10. An example of a suitable form of the tape 36 is a vinyl tape. Two tapes 36 may be provided parallel in the widthwise direction of the webbing as shown in FIG. 11, or a tape 36 may be provided at angles with respect to the lengthwise direction of the webbing as shown in FIG. 12.

What is claimed is:

1. A seat belt system provided with a take-up apparatus for taking up a long webbing placed around an occupant in the form of layers around a take-up shaft, comprising:
    a webbing having a remaining length wound around said take-up shaft when said webbing is placed around said occupant; and
    a plurality of high-friction pieces spacedly provided at least on said webbing remaining length would around said take-up shaft so as to be interposed between said layers of said webbing in said remaining length and having a larger coefficient of friction than that of said webbing.

2. A seat belt system according to claim 1, wherein said high-friction pieces comprise sheet-shaped members provided on a surface of said webbing.

3. A seat belt system according to claim 2, wherein each of said sheet-shaped members is a rubber sheet, a soft resin sheet or a tape.

4. A seat belt system according to claim 3, wherein said rubber sheet is made of a rubber material selected from the group consisting of butyl rubber, styrene-butadiene rubber, butadieneacrylonitrile rubber, chloroprene rubber or urethane rubber.

5. A seat belt system according to claim 3, wherein said soft resin sheet is vinyl chloride resin or vinyl chloride acetate resin to which a plasticizer is added.

6. A seat belt system according to claim 3, wherein said tape is made of cloth or vinyl resin.

7. A seat belt system according to claim 2, wherein said plurality of said sheet-shaped members are provided at a given distance along the length of said webbing so as to be able to cope with the stature of said occupant and the position of a seat on which said occupant is seated.

8. A seat belt system according to claim 2, wherein said sheet-shaped members are provided on both surfaces of said webbing.

9. A seat belt system according to claim 2, wherein each of said sheet-shaped members is a long substance having a width smaller than that of said webbing.

10. A seat belt system according to claim 9, wherein said webbing extends in a longitudinal direction and each of said sheet-shaped members extend at an angle relative to said longitudinal direction.

11. A seat belt system according to claim 1, wherein said high-friction pieces are provided by coating rubber or a soft resin on a surface of said webbing.

12. A seat belt system according to claim 11, wherein irregularities are formed in said coated portion.

13. A seat belt system according to claim 12, wherein said irregularities comprise powder or grains buried in said coated portion.

14. A seat belt system provided with a long webbing which is unwound from a take-up shaft for taking up said webbing in layers and is placed around an occupant seated on a seat of a vehicle, comprising:
a webbing having a remaining length wound around said take-up shaft when said webbing is placed around said occupant; and
a plurality of sheet-shaped high-friction members provided at least on said remaining length so as to be interposed between said layers of webbing in said remaining length and having a larger coefficient of friction than that of said webbing.

15. A seat belt system according to claim 14, wherein each of said high-friction members is a rubber sheet, soft resin sheet or a tape.

16. A seat belt system according to claim 14, wherein said plurality of high-friction members are provided at a given distance along the length of said webbing so as to be able to cope with the stature of said occupant and the position of said seat.

17. A seat belt system according to claim 14, wherein said high-friction members are provided on both surfaces of said webbing.

18. A seat belt system provided with a long webbing which is unwound from a take-up shaft for taking up said webbing in the form of layers and is placed around an occupant seated on a vehicle seat, comprising:
a webbing having such a length that a portion remains wound around said take-up shaft when said webbing is placed around said occupant; and
a plurality of coated portions spacingly provided at least in said portion of said webbing remaining around said take-up shaft in such a manner that they are interposed between said layers of webbing and have a larger coefficient of friction than that of said webbing.

19. A seat belt system according to claim 18, wherein said coated portions are formed on both surfaces of said webbing.

20. A seat belt system according to claim 18, wherein irregularities are formed in said coated portion and comprise powder or grains buried therein.

21. A seat belt system for restraining an occupant in a seat of a vehicle, comprising:
a webbing for wrapping around and restraining said occupant with said webbing having an excess length;
a take-up means having a take-up shaft for accommodating said excess length, and;
a plurality of high friction pieces secured to at least said excess length;
wherein said plurality of high friction pieces are interposed between layers of said webbing when said excess length is wound around said take-up shaft with said high friction pieces having a greater coefficient of friction than said webbing.

22. A seat belt system according to claim 21, wherein said webbing extends in a longitudinal direction and each of said high friction pieces have a length which extends parallel to said longitudinal direction over a portion of said excess length.

23. A seat belt system according to claim 21, wherein said webbing extends in a longitudinal direction and each of said high friction pieces have a length which extends at an angle relative to said longitudinal direction.

24. A seat belt system according to claim 23, wherein said angle is 90.

* * * * *